United States Patent
Lee

(10) Patent No.: US 7,216,818 B2
(45) Date of Patent: May 15, 2007

(54) WINDSHIELD WASHER FLUID RESERVOIR TANK DEVICE FOR VEHICLES

(75) Inventor: Byung-pyll Lee, Yongin-shi (KR)

(73) Assignee: Hyundai Mobis Co., Ltd., Seoul (KR)

(*) Notice: Subject to any disclaimer, the term of this patent is extended or adjusted under 35 U.S.C. 154(b) by 443 days.

(21) Appl. No.: 10/810,574

(22) Filed: Mar. 29, 2004

(65) Prior Publication Data

US 2005/0133623 A1   Jun. 23, 2005

(30) Foreign Application Priority Data

Dec. 18, 2003   (KR) .................. 10-2003-0092950

(51) Int. Cl.
*B05B 1/10* (2006.01)
*B60S 1/46* (2006.01)

(52) U.S. Cl. .............. 239/284.1; 280/164.1; 220/562

(58) Field of Classification Search ............ 280/163, 280/164.1, 164.2, 759, 782, 830; 239/284.1, 239/106; 296/193.12; 15/250.02; 429/100; 220/562, 890

See application file for complete search history.

(56) References Cited

U.S. PATENT DOCUMENTS

| | | | |
|---|---|---|---|
| 2,784,876 A * | 3/1957 | Bernard .................. 239/284.1 |
| 2,877,485 A * | 3/1959 | Oishei ..................... 15/250.02 |
| 2,889,569 A * | 6/1959 | Riester .................... 15/250.02 |
| 2,993,721 A * | 7/1961 | Bowman ..................... 280/759 |
| 4,832,262 A | 5/1989 | Robertson |
| 5,000,333 A * | 3/1991 | Petrelli ....................... 220/890 |
| 5,024,383 A * | 6/1991 | Vaschetto et al. ........ 239/284.1 |
| 5,183,099 A | 2/1993 | Bechu |
| 5,460,420 A * | 10/1995 | Perkins et al. .............. 293/106 |
| 5,853,025 A * | 12/1998 | Daneshvar ............... 239/284.1 |
| 6,508,414 B2 * | 1/2003 | Matsumoto et al. ..... 239/284.1 |
| 6,726,122 B2 * | 4/2004 | Zimmer .................... 239/284.1 |
| 2004/0142232 A1 * | 7/2004 | Risca et al. ................. 429/100 |

* cited by examiner

*Primary Examiner*—Hau Phan
(74) *Attorney, Agent, or Firm*—Greenblum & Bernstein, P.L.C.

(57) ABSTRACT

A windshield washer fluid reservoir tank for a vehicle is externally formed with a side stepping surface, and is internally defined with a space for storing windshield washer fluid replenished through a feeding pipe having a cap, and for allowing the windshield washer fluid stored therein to be pumped to a windshield of the vehicle through supply hoses under the operation of a supply motor pump installed in position within the windshield washer fluid reservoir tank, in order to ensure extended use of the windshield washer fluid without requiring frequent replenishment, by virtue of such a space having a sufficient storage capacity capable of storing a large amount of the windshield washer fluid.

2 Claims, 5 Drawing Sheets

WINDSHIELD WASHER FLUID RESERVOIR TANK DEVICE FOR VEHICLES

RELATED APPLICATION

The present disclosure relates to subject matter contained in Korean application No. 2003-92950, filed on Dec. 18, 2003, which is herein expressly incorporated by reference its entirety.

BACKGROUND OF THE INVENTION

1. Field of the Invention

The present invention relates to a vehicle, and more particularly to a windshield washer fluid reservoir tank for a vehicle, which is externally formed with a side stepping surface, and is internally defined with a space for storing windshield washer fluid, which is replenished through a feeding pipe having a cap, and for allowing the windshield washer fluid stored therein to be pumped onto a windshield of the vehicle through supply hoses under the operation of a supply motor pump installed in position within the windshield washer fluid reservoir tank, in order to ensure long use of the windshield washer fluid, without frequent replenishment thereof, by virtue of such an internal space having a storage capacity capable of storing a large amount of the windshield washer fluid.

2. Description of the Related Art

As is well known, a windshield washer fluid reservoir tank is a vehicular accommodation device used to temporarily store windshield washer fluid therein, which is ejected through windshield washer fluid spray nozzles to a windshield of a vehicle, in order to clean the windshield polluted with dirt and other debris generated during traveling, thereby maintaining optimum windshield visibility.

Usually, the windshield washer fluid reservoir tank has a storage capacity of 3 to 4 liters, and is installed to an inner side surface of an engine compartment or is installed internally to a rear fender panel.

FIG. 1 is a perspective view illustrating a conventional windshield washer fluid reservoir tank for a vehicle.

According to the illustrated configuration, the conventional windshield washer fluid reservoir tank, designated as reference numeral 2, comprises a body 4 for receiving windshield washer fluid therein, a mounting portion 12 which is used for the fixation of the body 4 relative to the wall of a vehicle body 10 through the fastening of a fixing screw 14, a feeding pipe 16 which is used to replenish the windshield washer fluid into the body 4, a cap 18 for selectively opening and closing the feeding pipe 16, and a supply motor pump 6 which is installed at one side of the body 4 and is adapted to supply the windshield washer fluid to a windshield of a vehicle through supply hoses 8.

With such a configuration, in case the windshield washer fluid is ejected to the windshield through the supply hoses 8 under operation of the supply motor pump 6, and is exhausted during movement of the vehicle, for example, a vehicle, a user must first open a hood of the vehicle, and then separate the cap 18 from the feeding pipe 16 in order to replenish a required amount of windshield washer fluid through the feeding pipe 16.

As can be seen from the above description, the conventional windshield washer fluid reservoir tank 2 for a vehicle is troublesome in the replenishment of the windshield washer fluid since it is installed inside the engine compartment of the vehicle and thus a user must first open the hood of the vehicle. Furthermore, due to the fact that such a vehicle usually consumes a large amount of windshield washer fluid, the conventional windshield washer fluid reservoir tank 2 having a low storage capacity has a problem related to frequent replenishment of the windshield washer fluid.

SUMMARY OF THE INVENTION

Therefore, the present invention has been made in view of the above problems, and it is an object of the present invention to provide a windshield washer fluid reservoir tank for a vehicle, which is externally formed with a side stepping surface, and is internally defined with a space for storing windshield washer fluid, which is replenished through a feeding pipe having a cap, and for allowing the windshield washer fluid stored therein to be pumped onto a windshield of the vehicle through supply hoses under the operation of a supply motor pump installed in position within the windshield washer fluid reservoir tank, in order to ensure extended use of the windshield washer fluid without frequent replenishment, by virtue of such an internal space having sufficient storage capacity capable of storing a large amount of the windshield washer fluid.

In accordance with the present invention, the above and other objects can be accomplished by the provision of a windshield washer fluid reservoir tank device for a vehicle comprising: a windshield washer fluid reservoir tank, which is internally defined with an elongated windshield washer fluid receiving space, and is externally formed with a side stepping surface allowing a user to step on the side stepping surface while boarding the vehicle; a plurality of posts fixed at one surface of the windshield washer fluid reservoir tank so that they protrude upward in a vertical direction; a plurality of fixing members formed at the posts in a one to one ratio, and coming into contact with an inner surface of a vehicle body panel so that they are fixed thereto as a plurality of fixing bolts are fastened into screw bores of the fixing members; a windshield washer fluid supply motor pump which is mounted on a bottom lateral region inside the windshield washer fluid reservoir tank and is adapted to eject the windshield washer fluid toward a windshield of the vehicle through supply hoses; and a windshield washer fluid feeding pipe protruding upward from an upper side portion of the windshield washer fluid reservoir tank and having a cap to be opened for replenishment of the windshield washer fluid.

Preferably, the windshield washer fluid feeding pipe may have a wrinkled portion configured to be bent in a desired direction for the fixation of the feeding pipe.

Preferably, the side stepping surface of the windshield washer fluid reservoir tank may be formed thereon with a lattice pattern for endowing a skid-proof function thereto.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference will now be made in greater detail to a preferred embodiment of the invention, an example of which is illustrated in the accompanying drawings.

Figure 1:
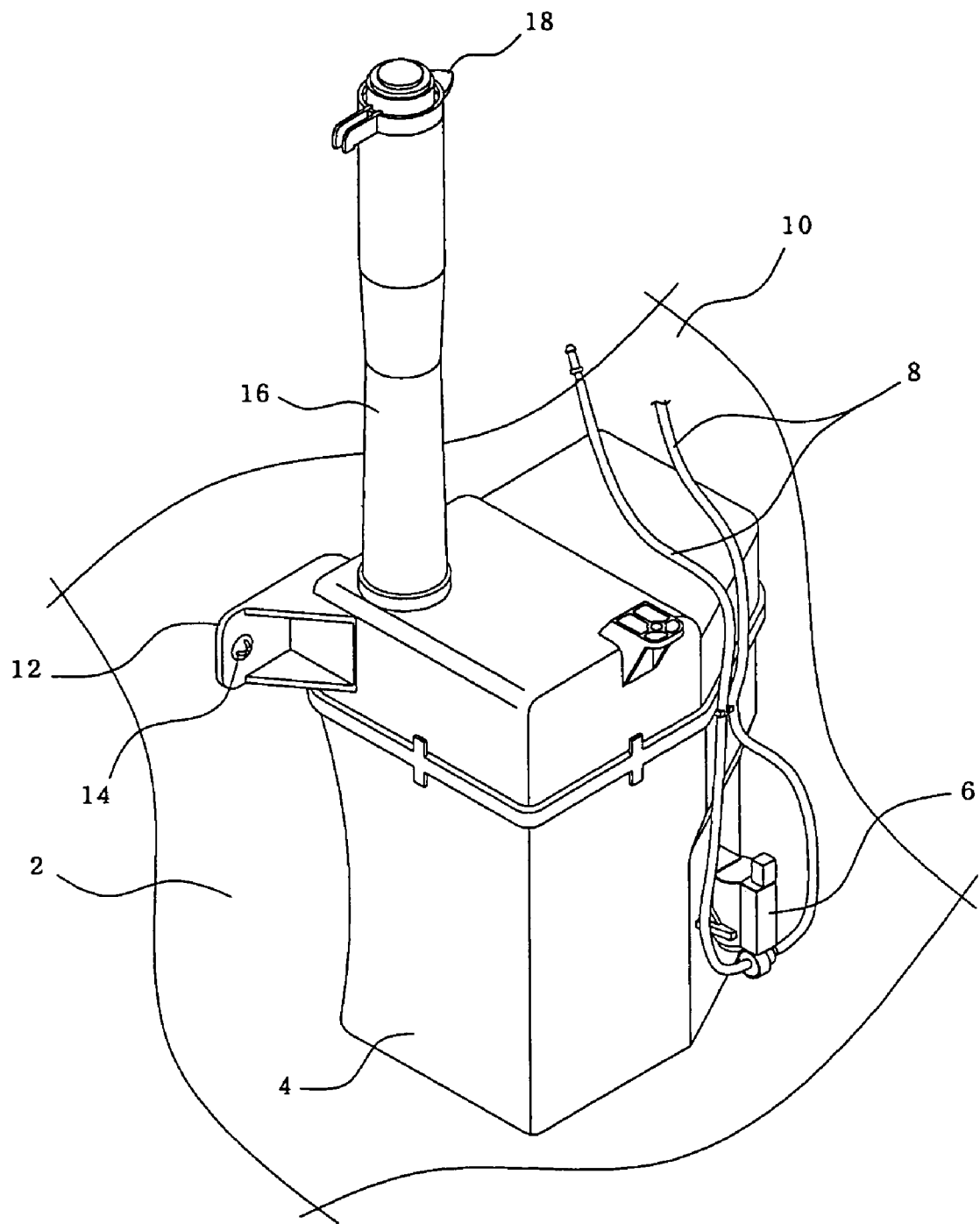
FIG. 1 is a perspective view illustrating a conventional windshield washer fluid reservoir tank for a vehicle.
Figure 2:
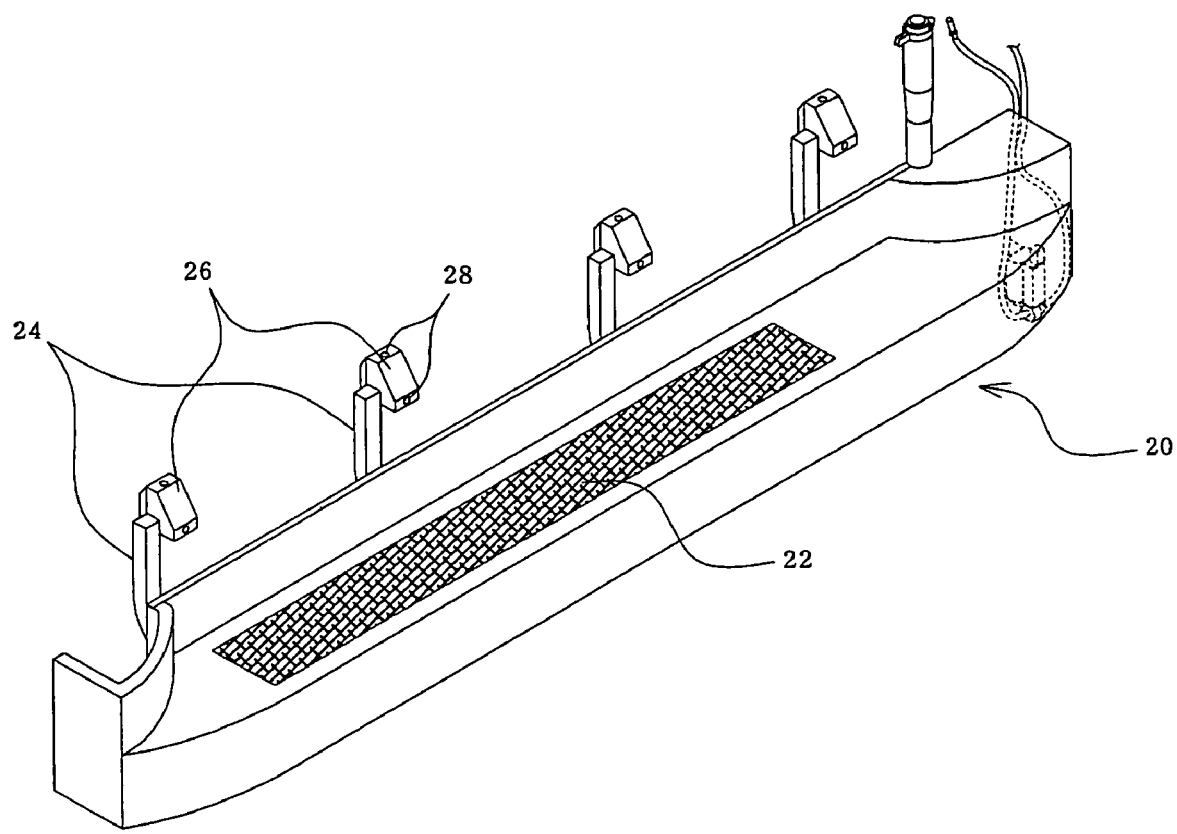
FIG. 2 is a perspective view illustrating a windshield washer fluid reservoir tank for a vehicle in accordance with the present invention.
Figure 3:
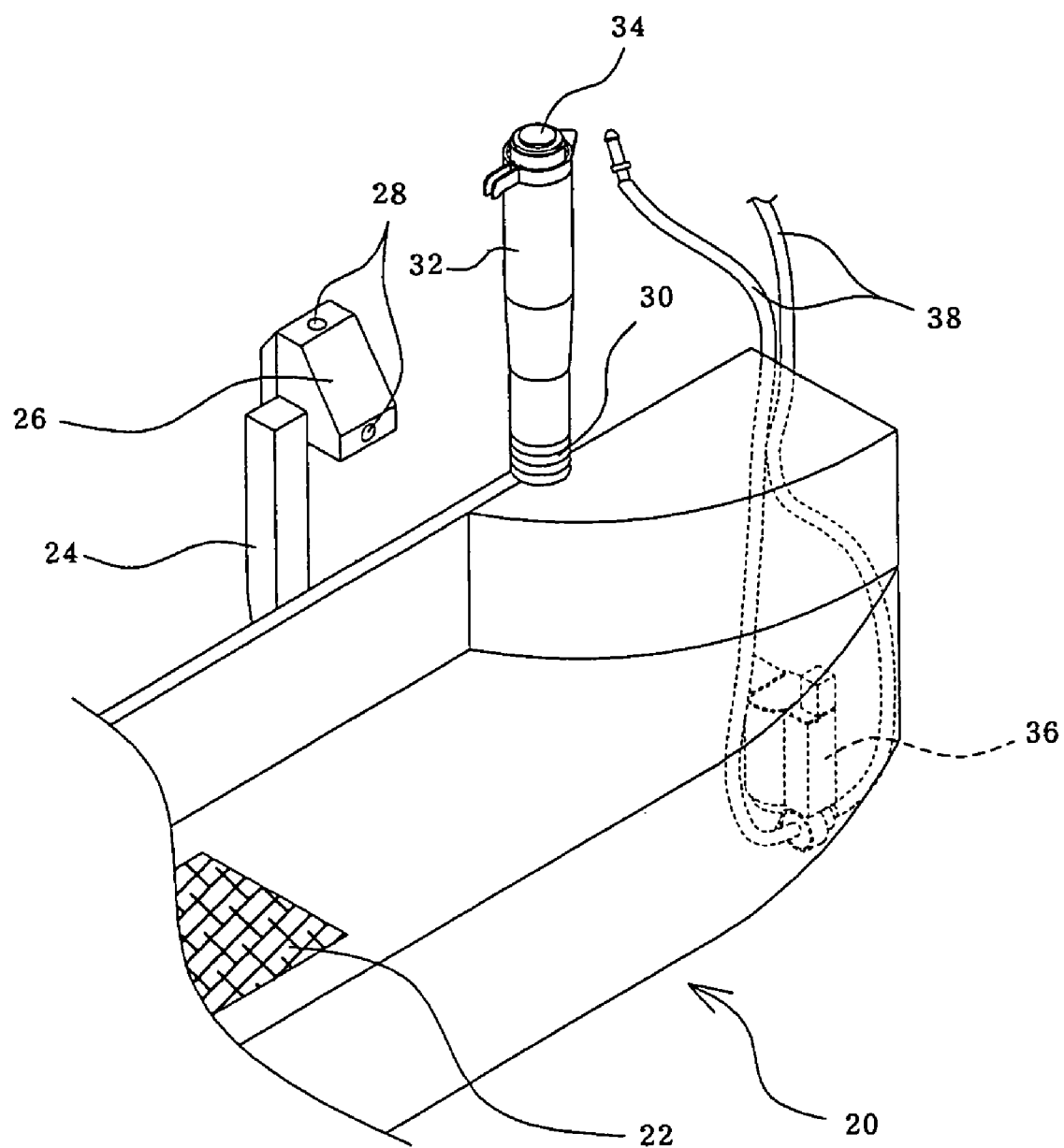
FIG. 3 is a perspective view illustrating an important portion of the windshield washer fluid reservoir tank shown in FIG. 2.
Figure 4:
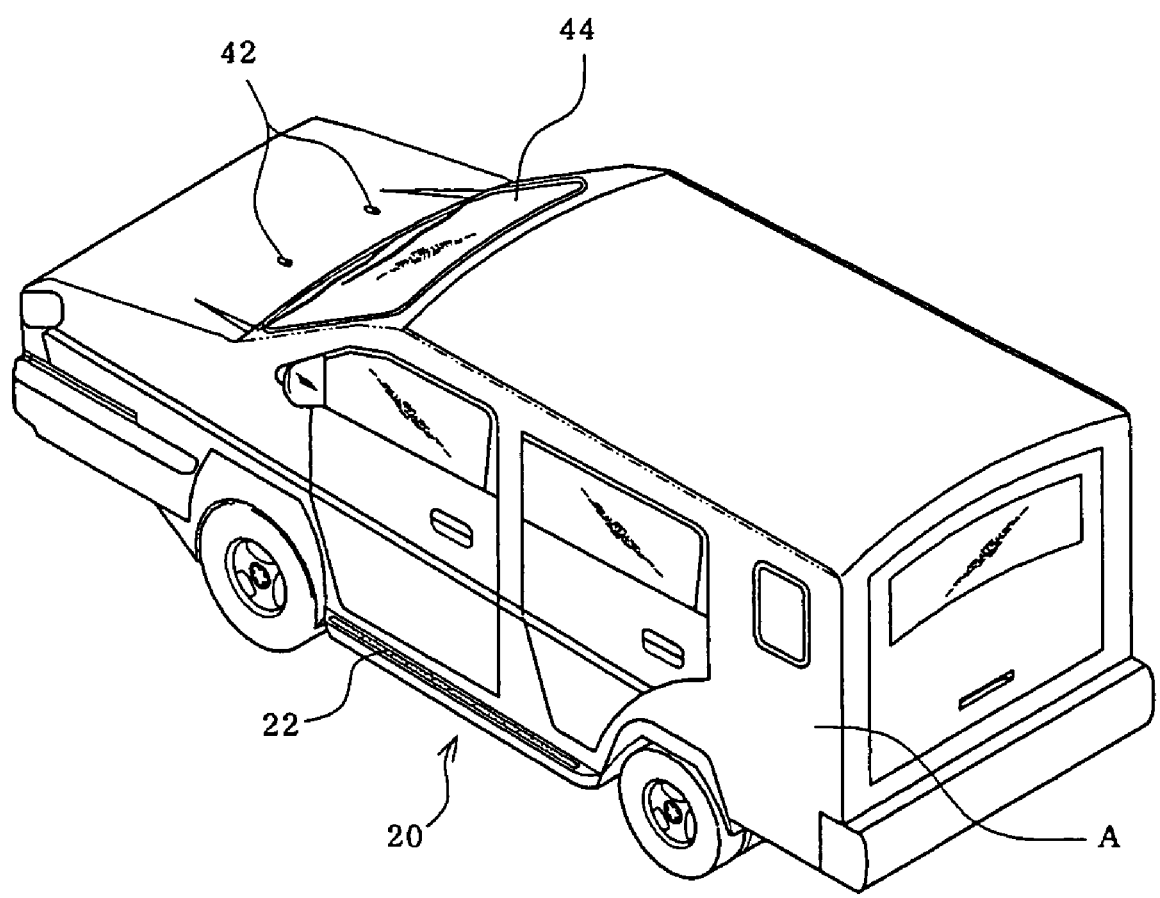
FIG. 4 is a perspective view illustrating a state wherein the windshield washer fluid reservoir tank in accordance with the present invention is installed inside a vehicle.
Figure 5:
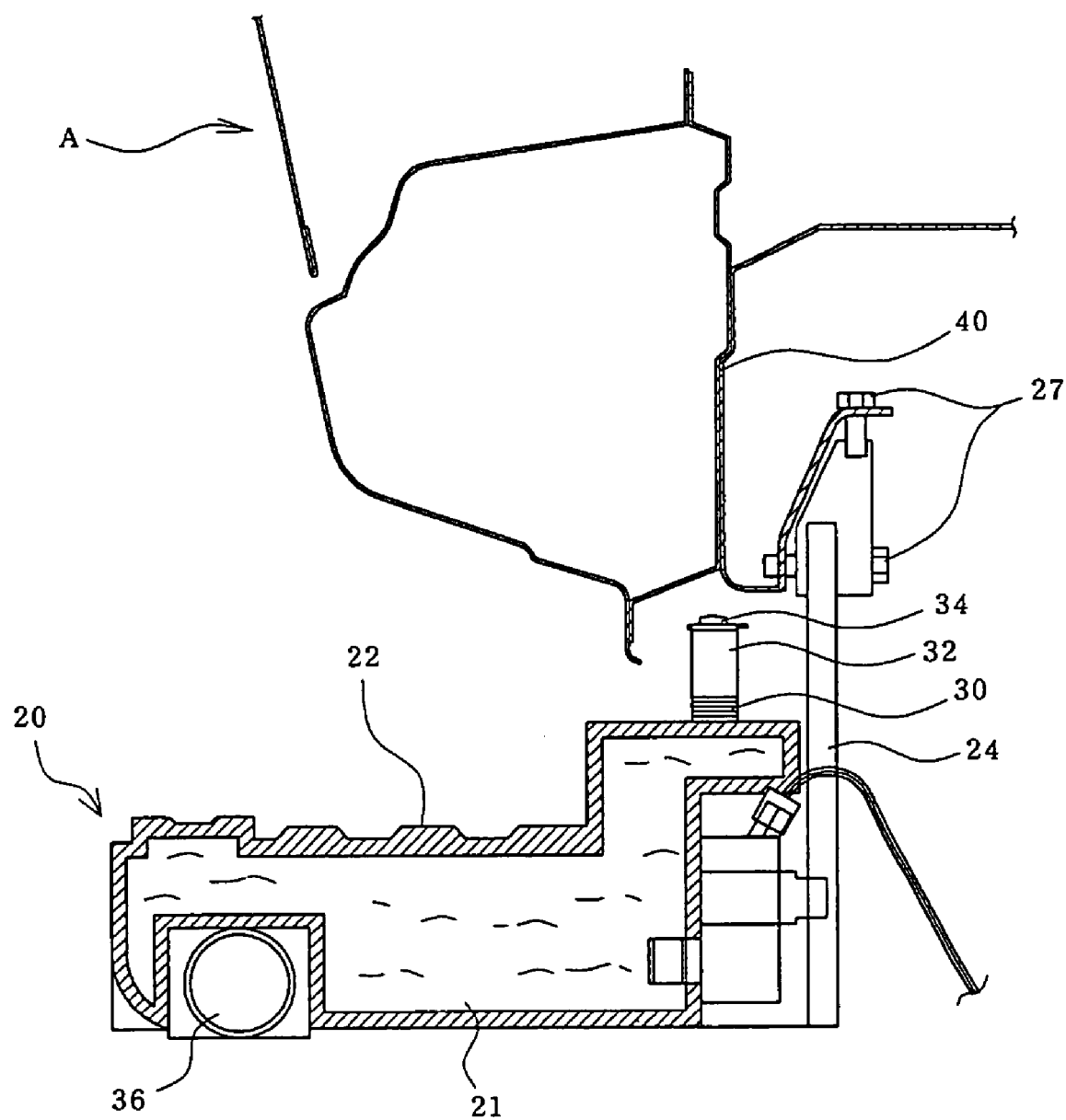
FIG. 5 is a sectional view illustrating a state wherein the windshield washer fluid reservoir tank in accordance with the present invention is installed in a vehicle.

Referring to FIGS. 2 to 5 illustrating a windshield washer fluid reservoir tank device in accordance with the present invention, it comprises an elongated windshield washer fluid reservoir tank 20, which is internally defined with an elongated windshield washer fluid receiving space 21, and is externally formed with a side stepping surface 22 allowing a user to step on the side stepping surface 22 while boarding a vehicle. The windshield washer fluid reservoir tank device further comprises a plurality of posts 24 which are affixed at one side, more particularly a rear surface, of the windshield washer fluid reservoir tank 20 so that they protrude upward in a vertical direction, a plurality of fixing members 26 which are integrally formed at the posts 24 in a one to one ratio and come into contact with an inner surface of a vehicle body panel 40 so that they are fixed thereto as a plurality of fixing bolts 27 are fastened into screw bores 28 of the fixing members 26, a windshield washer fluid supply motor pump 36 which is mounted in a bottom lateral region inside the windshield washer fluid reservoir tank 20 and is adapted to pump the windshield washer fluid toward a windshield 44 through supply hoses 38, and a windshield washer fluid feeding pipe 32 which protrudes upward from an upper side portion of the windshield washer fluid reservoir tank 20 and is closed by a cap 34.

The feeding pipe 32 is formed at a lower end region thereof with a wrinkled portion 30, which is configured so as to be bent in a desired direction for the fixation of the feeding pipe 32.

The side stepping surface 22 of the windshield washer fluid reservoir tank 20 is formed thereon with a lattice pattern for endowing a skid-proof function thereto.

Although it is preferable that the windshield washer fluid reservoir tank 20 is manufactured through molding of a plastic material, if necessary, it may be manufactured by the bending or welding of a metal material.

The windshield washer fluid reservoir tank 20 is formed to have a rigid reinforced side surface for the fixation thereof using molding or welding.

Now, the operation and effects of the present invention will be explained in conjunction with the drawings.

Considering an assembling procedure of the windshield washer fluid reservoir tank device in accordance with the present invention, the windshield washer fluid reservoir tank 20 is first manufactured to have the windshield washer fluid receiving space 21 therein.

To one surface of the windshield washer fluid reservoir tank 20 are affixed the plurality of the posts 24 so that they protrude upward in a vertical direction. Each post 24 is provided laterally at an upper end region thereof with each fixing member 26 having the screw bores 28.

Inside the windshield washer fluid reservoir tank 20 is installed the supply motor pump 36 in a bottom lateral region. The supply motor pump 36 is a perfectly waterproofing processed pump. Then, the supply hoses 38 are connected to the supply motor pump 36 so that they are connected to windshield washer fluid spray nozzles 42 installed onto the hood of a vehicle by penetrating through the engine compartment.

The windshield washer fluid reservoir tank 20 is fixedly mounted to the vehicle as the fixing bolts 27 penetrate through the vehicle body panel 40 located in a lateral region of a vehicle (A), and are fastened into the screw bores 28 formed at the fixing members 26.

When boarding or alighting from the vehicle (A), a driver or passenger steps on the side stepping surface 22 externally formed to the windshield washer fluid reservoir tank 20.

In this assembled state, windshield washer fluid is sent to the windshield washer fluid receiving space 21 through the feeding pipe 32. It will be clearly understood from the above description that the windshield washer fluid reservoir tank 20 is capable of storing a large amount of the windshield washer fluid by virtue of its windshield washer fluid receiving space 21 providing a sufficient storage capacity.

During replenishment of the windshield washer fluid, preferably, the feeding pipe 32 is flexibly bent through the wrinkled portion 30 thereof, and is fixed to a rear surface portion or lateral portion of the windshield washer fluid reservoir tank 20 by making use of fixing hooks, and the like.

Meanwhile, as the supply motor pump 36 operates, the windshield washer fluid is ejected onto the windshield 44 through the supply hoses 38 and the windshield washer fluid spray nozzles 42, thereby being used to remove any pollutant attached to the windshield 44 under the operation of wiper blades.

As apparent from the above description, the present invention provides a windshield washer fluid reservoir tank for a vehicle, which is externally formed with a side stepping surface, and is internally defined with a space for storing windshield washer fluid sent through a feeding pipe having a cap, and allowing the windshield washer fluid stored therein to be pumped to a windshield of the vehicle through supply hoses under the operation of a supply motor pump installed in position within the windshield washer fluid reservoir tank, in order to ensure extended use of the windshield washer fluid without requiring frequent replenishment, by virtue of such an internal space having a sufficient storage capacity capable of storing a large amount of the windshield washer fluid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A windshield washer fluid reservoir tank device for a vehicle comprising:
   a washer fluid reservoir tank, which is internally defined with an elongated washer fluid receiving space, and is externally formed with a side stepping surface that allows a user to step on the side stepping surface while boarding or alighting from the vehicle;
   a plurality of posts affixed at one surface of the washer fluid reservoir tank so that the posts protrude upward in a vertical direction;
   a plurality of fixing members integrally formed at the posts in a one to one ratio, and contacting an inner surface of a vehicle body panel so that the fixing members are fixed thereto;

a washer fluid supply motor pump which is mounted on a bottom lateral region inside the washer fluid reservoir tank and is adapted to eject the washer fluid toward a windshield of the vehicle through supply hoses; and a washer fluid feeding pipe protruding upward from an upper side portion of the washer fluid reservoir tank and having a cap to be opened for replenishment of the washer fluid, wherein the windshield washer fluid feeding pipe comprises a winkled portion configured to be bent in a desired direction, and each of the fixing members is integrally formed at a side of each of the posts.

2. The device as set forth in claim 1, wherein the side stepping surface of the washer fluid reservoir tank is formed thereon with a lattice pattern that endows a skid-proof function thereto.

* * * * *